(12) United States Patent
Basson

(10) Patent No.: US 12,526,130 B2
(45) Date of Patent: Jan. 13, 2026

(54) CRYPTOGRAPHIC HASH DIGESTS FROM QUANTUM INFORMATION

(71) Applicant: Accenture Global Solutions Limited, Dublin (IE)

(72) Inventor: Johannes Jacobus Louw Basson, Arlington, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 272 days.

(21) Appl. No.: 18/229,994

(22) Filed: Aug. 3, 2023

(65) Prior Publication Data
US 2025/0047468 A1    Feb. 6, 2025

(51) Int. Cl.
*H04L 9/06* (2006.01)
*H04L 9/08* (2006.01)

(52) U.S. Cl.
CPC .......... *H04L 9/0643* (2013.01); *H04L 9/0852* (2013.01)

(58) Field of Classification Search
CPC .............. H04L 9/0643; H04L 9/0852
See application file for complete search history.

(56) References Cited

U.S. PATENT DOCUMENTS

| | | | |
|---|---|---|---|
| 10,708,046 B1* | 7/2020 | Ashrafi | H04L 9/0852 |
| 2019/0319799 A1* | 10/2019 | Suresh | G06F 9/3877 |
| 2021/0111898 A1* | 4/2021 | McCarty | H04L 9/3213 |
| 2024/0377650 A1* | 11/2024 | McCarty | G02B 27/286 |
| 2025/0047468 A1* | 2/2025 | Basson | H04L 9/0852 |

OTHER PUBLICATIONS

Li et al., "Discrete-time interacting quantum walks and quantum Hash schemes," Quantum Information Processing, May 24, 2012, 12:1501-1513.

* cited by examiner

*Primary Examiner* — Ponnoreay Pich
(74) *Attorney, Agent, or Firm* — Mannava & Kang, P.C.

(57) ABSTRACT

Methods, systems, and apparatus for generating a cryptographic hash digest. In one aspect, a method includes obtaining data representing a quantum circuit. An initial quantum state vector is generated, where the initial quantum state vector includes an input quantum state vector for the quantum circuit. The initial quantum state vector is used to generate one or more evolved quantum state vectors, where each evolved quantum state vector is generated by applying a respective portion of the quantum circuit to the initial quantum state vector. Logical operations are iteratively applied to floating point binary representations of the initial and evolved quantum state vectors to obtain a binary string, and a hash function is applied to the binary string to obtain a cryptographic hash digest of the quantum circuit.

18 Claims, 11 Drawing Sheets

CRYPTOGRAPHIC HASH DIGESTS FROM QUANTUM INFORMATION

TECHNICAL FIELD

This specification relates to the fields of cryptography, computer security, and quantum computing.

BACKGROUND

A hash function is a function that can be used to map data of arbitrary size and type to fixed-length strings of characters. The values returned by a hash function are called hash digests, hash values, hash codes, or hashes. Hash functions act as one-way functions-they are easy and fast to compute forward, but hard to reverse back. Hash functions are typically deployed as a security mechanism in most forms of digital communication and have various use cases including password storage, digital signatures, file management, and authentication.

Existing hash functions that generate hash digests from quantum information are based on random-walks or other non-deterministic functions that are reversible and do not demonstrate traditional hash qualities. For example, they are not universal, one-way, deterministic, quick to compute, or collision resistant.

SUMMARY

This specification describes systems, methods, devices and other techniques for generating hash digests from quantum information.

In general, one innovative aspect of the subject matter described in this specification can be implemented in a method that includes obtaining data representing a quantum circuit; generating an initial quantum state vector, wherein the initial quantum state vector comprises an input quantum state vector for the quantum circuit; generating, using the initial quantum state vector, one or more evolved quantum state vectors, wherein each evolved quantum state vector is generated by applying a respective portion of the quantum circuit to the initial quantum state vector; iteratively applying logical operations to floating point binary representations of the initial and evolved quantum state vectors to obtain a binary string; and applying a hash function to the binary string to obtain a cryptographic hash digest of the quantum circuit.

Other implementations of this aspect include corresponding computer systems, apparatus, and computer programs recorded on one or more computer storage devices, each configured to perform the actions of the methods. A system of one or more classical computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations iteratively applying logical operations to floating point binary representations of the quantum state vectors to obtain a binary string comprises: for a first iteration, applying a first logical operation between a floating point binary representation of the initial quantum state vector and a floating point binary representation of a first evolved quantum state vector, and for each iteration after the first iteration, applying a logical operation between an output of a previous iteration and a floating point binary representation of a current evolved quantum state vector for the iteration.

In some implementations the logical comprise XOR operations.

In some implementations the method further comprises, for each quantum state vector: identifying a real part and an imaginary part of the quantum state vector; and generating a floating point binary representation of the real part of the quantum state vector and a floating point binary representation of the imaginary part of the quantum state vector.

In some implementations identifying the real part and the imaginary part of the quantum state vector comprises parsing a complex number associated with the quantum state vector and applying a splitting operation to split the complex number into a real part and an imaginary part.

In some implementations the method further comprises, for each quantum state vector: concatenating the floating point binary representation of the real part of the quantum state vector and the floating point binary representation of the imaginary part of the quantum state vector, wherein iteratively applying the logical operations to the floating point binary representations of the quantum state vectors to obtain the binary string comprises iteratively applying the logical operations to concatenated floating point binary representations of the quantum state vectors.

In some implementations the method further comprises, for each quantum state vector: interleaving the floating point binary representation of the real part of the quantum state vector with the floating point binary representation of the imaginary part of the quantum state vector, wherein iteratively applying the logical operations to the floating point binary representations of the quantum state vectors to obtain the binary string comprises iteratively applying the logical operations to interleaved floating point binary representations of the quantum state vectors.

In some implementations the method further comprises encrypting the floating point binary representations of the quantum state vectors prior to application of the logical operations.

In some implementations the method further comprises partitioning, in time, the quantum circuit into one or more portions, wherein each evolved quantum state vector corresponds to evolution of the initial quantum state vector under a respective portion of the quantum circuit.

In some implementations the quantum circuit implements a quantum algorithm or prepares a target quantum state.

In some implementations the method further comprises receiving a classical data input; and encoding the classical data input as a quantum circuit.

In some implementations generating the one or more evolved quantum state vectors comprises performing classical computations.

In some implementations the method further comprises transmitting, to a quantum computing server, a request that instructs the quantum computing server to: execute the quantum circuit on an initial quantum state that corresponds to the initial quantum state vector, and compute a cryptographic hash digest of the quantum circuit using measured evolved quantum state vectors; receiving, from the quantum computing server, results of execution of the quantum circuit and the cryptographic hash digest; and verifying the results of execution of the quantum circuit using the cryptographic hash digest computed by the quantum computing server.

In general, another innovative aspect of the subject matter described in this specification can be implemented in a method performed by a quantum computer, the method including obtaining data specifying a quantum computation, wherein the data comprises data representing a quantum circuit, an initial quantum state of a quantum system, and instructions to compute a cryptographic hash digest of the quantum circuit; applying the quantum circuit to the initial quantum state of the quantum system to perform the quantum computation, comprising generating one or more evolved quantum state vectors according to the instructions to compute the cryptographic hash digest of the quantum circuit, wherein generating each evolved quantum state vector comprises applying a respective portion of the quantum circuit to the initial quantum state; iteratively applying logical operations to floating point binary representations of the initial quantum state and the one or more evolved quantum state vectors to obtain a binary string; and applying a hash function to the binary string to obtain a cryptographic hash digest of the quantum circuit.

Other implementations of this aspect include corresponding classical and quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the data specifying the quantum computation is received from a client device and the method further comprises transmitting a result of the quantum computation and the cryptographic hash digest of the quantum circuit to the client device.

The subject matter described in this specification can be implemented in particular ways so as to realize one or more of the following advantages.

Current solutions for generating a hash digest from quantum information provide quantum information as stored in a computer memory binary as input to a hash function. However, a problem with accessing the quantum information in memory and performing a plain binary conversion is that it is not safe from traditional hash algorithm attacks. For example, it has been shown that adversaries are able to reverse some of these one-way hash computations and recover the original information from the hash digest.

A system implementing the presently described hashing techniques addresses this problem and can achieve improved security and robustness against adversarial attacks. The quantum information in memory is efficiently converted into an irreversible binary string before it is provided as input to a hash function. Therefore, if an adversary managed a reverse computation of a hash digest of the quantum information, the resulting string would still be mangled and unreadable. In addition, parameters of the presently described hashing technique can be adjusted to further improve security and robustness against adversarial attacks. For example, increasing the number of quantum state vectors used when generating the irreversible binary string increases the search space for a brute force attack and improves the avalanche effect of hash digest generation.

Further, this increase can be efficiently implemented since the computational overhead associated with increasing the number of quantum state vectors is based on classical logical computations, e.g., XOR computations, which can be executed quickly at a classical computation gate level.

In addition, the presently described hashing technique demonstrates traditional hash qualities. For example, the presently described hashing technique is deterministic and can therefore verify the same information or evolution every time. Further, the presently described hashing technique is a one-way-function and therefore cannot be reversed (unlike conventional quantum hash functions). Further, the presently described hashing technique serves as a method for encoding quantum information, e.g., quantum algorithms, quantum states, or quantum circuits, as an intermediary lookup table, which provides a hash digest that can be used in subsequent applications.

Further, whilst the presently described hashing technique is motivated by quantum computing and can be used to generate hashes of quantum information, the techniques are based on classical computations and do not require special purpose hardware.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for generating cryptographic hash digests from quantum information. As summarized here and described in greater detail in the following descriptions, the techniques described herein facilitate efficient conversion of quantum information in memory into an irreversible binary string by partitioning the quantum information into multiple groups and generating quantum state vectors for each group. The quantum state vectors are iteratively combined using logical operations, e.g., XOR operations, to produce the irreversible binary string. The irreversible binary string is then provided as input to a hash function that generates the hash digest.

Figure 1:
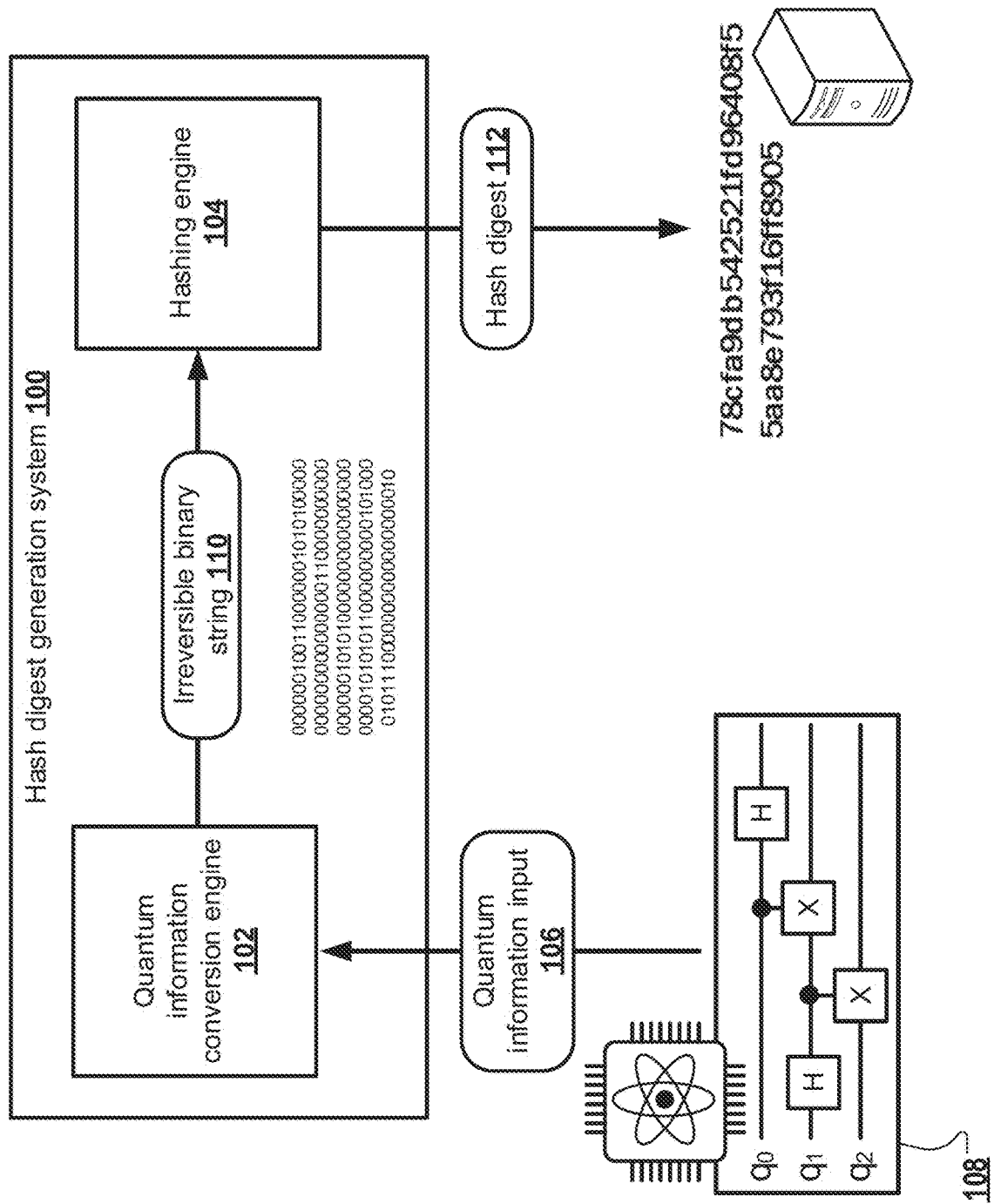
FIG. 1 shows a conceptual block diagram of an example system for generating a cryptographic hash digest of quantum information.

FIG. 1 shows a conceptual block diagram of an example system 100 for generating a cryptographic hash digest of quantum information. The example system 100 includes a quantum information conversion engine 102 and a hashing engine 104. The quantum information conversion engine 102 and hashing engine 104 can exchange electronic communications over one or more networks, or can exchange communications in another way, such as over one or more wired or wireless connections. As used herein, the term "engine" refers to a set of computing/programmatic instructions, that when executed by a data processing apparatus (e.g., a processor), result in the performance of certain operations associated with the underlying component (e.g., the quantum information conversion engine or the hashing engine).

The quantum information conversion engine 102 is configured to receive quantum information as input 106. The quantum information can include data representing a quantum object, e.g., a quantum circuit. In this specification, the term "quantum circuit" is used to refer to a sequence of quantum logic operations that can be applied to a quantum system, e.g., a qubit register, prepared in a selected initial quantum state to perform a respective computation. The quantum circuit can represent a quantum algorithm, e.g., where executing the quantum circuit implements the quantum algorithm. Alternatively, the quantum circuit can represent a quantum state, e.g., where executing the quantum circuit causes the selected initial quantum state to evolve to the quantum state. Alternatively, the quantum circuit can encode classical data.

The quantum information conversion engine 102 processes the quantum information input 106 and generate as output an irreversible binary string 110 that represents the quantum information input 106. For example, the quantum information conversion engine 102 can generate an initial quantum state vector, where the initial quantum state vector represents an input quantum state for the quantum circuit. The quantum information conversion engine 102 can then use the initial quantum state vector to generate one or more evolved quantum state vectors, where each evolved quantum state vector is generated through application of a respective portion of the quantum circuit to the initial quantum state vector. In some implementations, the operations performed by the quantum information conversion engine 102 to generate the quantum state vectors can include classical operations only, e.g., as described below with reference to FIG. 2. In other implementations, the operations performed by the quantum information conversion engine 102 to generate the quantum state vectors can include classical operations and quantum computing operations, e.g., as described below with reference to FIG. 7.

The quantum information conversion engine 102 then iteratively applies logical operations, e.g., XOR operations or other non-reversible operations, to floating point binary representations of the generated quantum state vectors to generate the irreversible binary string 110. Example operations performed by the quantum information conversion engine 102 are described in more detail below with reference to FIGS. 2-7.

The hashing engine 104 is configured to receive the irreversible binary string 110 from the quantum information conversion engine 102 and apply a hashing function to the irreversible binary string 110 to compute a cryptographic hash digest 112 of the quantum information input 106. Example operations performed by the hashing engine 104 are described in more detail below with reference to FIGS. 2-7.

Figure 2:
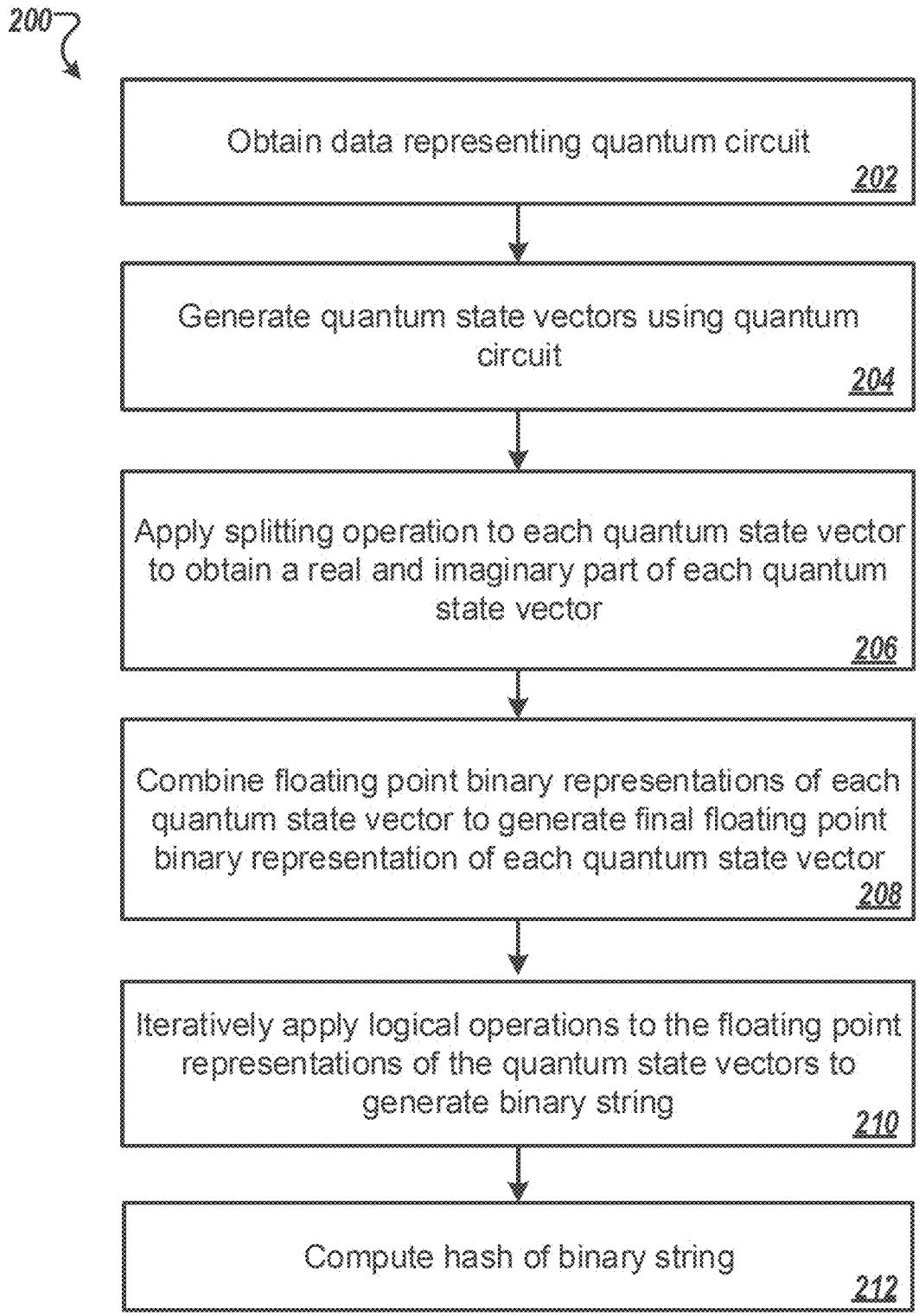
FIG. 2 is a flow diagram of an example process for generating a cryptographic hash digest of quantum information.

FIG. 2 is a flowchart of an example process 200 for generating a cryptographic hash digest of quantum information. For convenience, the process 200 will be described as being performed by a system that includes one or more classical computing devices located in one or more locations. For example, system 100 of FIG. 1, appropriately programmed in accordance with this specification, can perform the process 200.

The system obtains data representing a quantum circuit (step 202). As described above with reference to FIG. 1, in some implementations, the quantum circuit implements a quantum algorithm or prepares a target quantum state. In other implementations, the quantum circuit can encode a classical data input, e.g., any classical data that can be represented as a binary string. For example, the system can receive a classical data input and apply quantum encoding techniques to encode the classical data input as a quantum circuit, e.g., a quantum circuit with parameters that are determined by the classical data input. Example quantum encoding techniques include basis encoding, amplitude encoding, angle encoding, instantaneous quantum polynomial (IQP) encoding, and Hamiltonian evolution ansatz encoding.

Figure 3A:
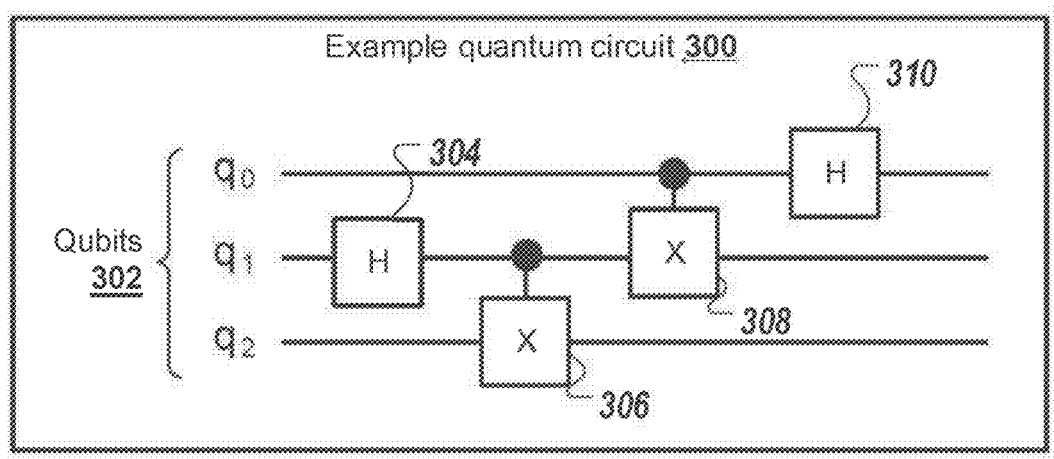
FIG. 3A shows an example quantum circuit.

An example quantum circuit (quantum circuit 300) is shown in FIG. 3A and is described as follows. In this example, the quantum circuit 300 operates on three qubits 302 (labelled $q_0$, $q_1$, $q_2$), however this is for illustrative purposes only and the quantum circuit could operate on a smaller or larger number of qubits. Generally, the number of qubits on which it operates depends on the underlying data that the quantum circuit represents, e.g., the complexity and/or size of the underlying quantum algorithm or quantum state. Further, in this example the quantum circuit 300 includes four quantum logic gates—a first Hadamard gate 304 that is applied to the second qubit $q_1$, a first CNOT gate 306 that is applied to the third qubit $q_2$ and the second qubit $q_1$ (where the second qubit acts as a control), a second first CNOT gate 308 that is applied to the second qubit $q_1$ and the first qubit $q_0$ (where the first qubit acts as a control), and a second Hadamard gate 310 that is applied to the first qubit $q_0$—however this is for illustrative purposes only and the quantum circuit could include fewer or more quantum logic gates and can include different types of quantum logic gates. Generally, the number of quantum logic gates and types of quantum logic gates included in the quantum circuit depends on the underlying data that the quantum circuit represents.

Returning to FIG. 2, the system uses the data representing the quantum circuit (as received at step 202) to generate multiple quantum state vectors (step 204). A quantum state vector is a classical data object that represents a quantum state. Since the mathematical formalism of quantum physics is expressed in terms of complex numbers, each quantum state vector is associated with a respective complex number (which in turn includes a real and an imaginary part).

The multiple quantum state vectors can include an initial quantum state vector and one or more evolved quantum state vectors. The initial quantum state vector can correspond to an input quantum state vector for the quantum circuit. That is, the data representing the quantum circuit can include data specifying an input quantum state for the quantum circuit, and this data can be used as the initial quantum state vector. For example, the quantum state vector can have a length that is equal to the number of qubits on which the quantum circuit operates and can contain arbitrarily initialized values, e.g., that correspond to reset or otherwise initialized qubits.

Each evolved quantum state vector is defined as a quantum state vector that is generated through application of a respective portion of the quantum circuit to the initial quantum state vector. For example, the system can use the data representing the quantum circuit to partition the quantum circuit in time into one or more portions. Each evolved quantum state vector can then correspond to evolution of the initial quantum state vector under a respective portion of the quantum circuit. The initial and evolved state vectors are now described with reference to FIGS. 3B and 3C.

Figure 3B:
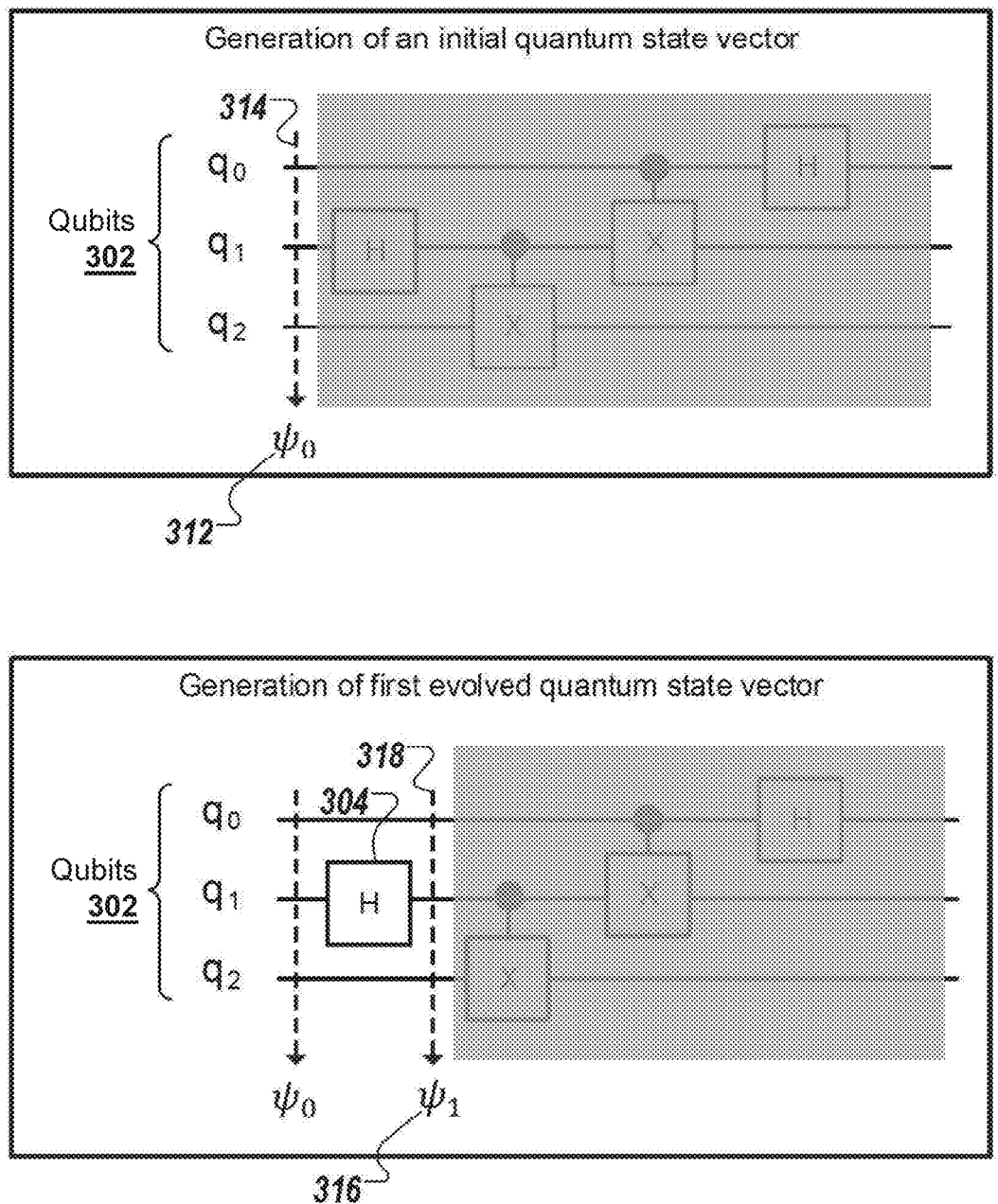
FIG. 3B shows an example initial quantum state vector and a first evolved quantum state vector for the example quantum circuit shown in FIG. 3A.

FIG. 3B shows an example initial quantum state vector 312 for the example quantum circuit 300 shown in FIG. 3A. As described above, the initial quantum state vector 312 can represent an input quantum state vector $\psi_0$ for the quantum circuit and therefore corresponds to a time-stamp at time t=0 (represented by the vertical dashed line 314).

FIG. 3B also shows an example first evolved quantum state vector 316 for the example quantum circuit 300 shown in FIG. 3A. The first evolved quantum state vector 316 corresponds to evolution of the initial quantum state vector 312 under a first portion of the quantum circuit 300, where in this example the first portion of the quantum circuit includes the first Hadamard gate 304. The first evolved quantum state vector 316 for the quantum circuit corresponds to a time-stamp at time t=1 (represented by the vertical dashed line 318) and is therefore also labelled and referred to herein as $\psi_1$.

Figure 3C:
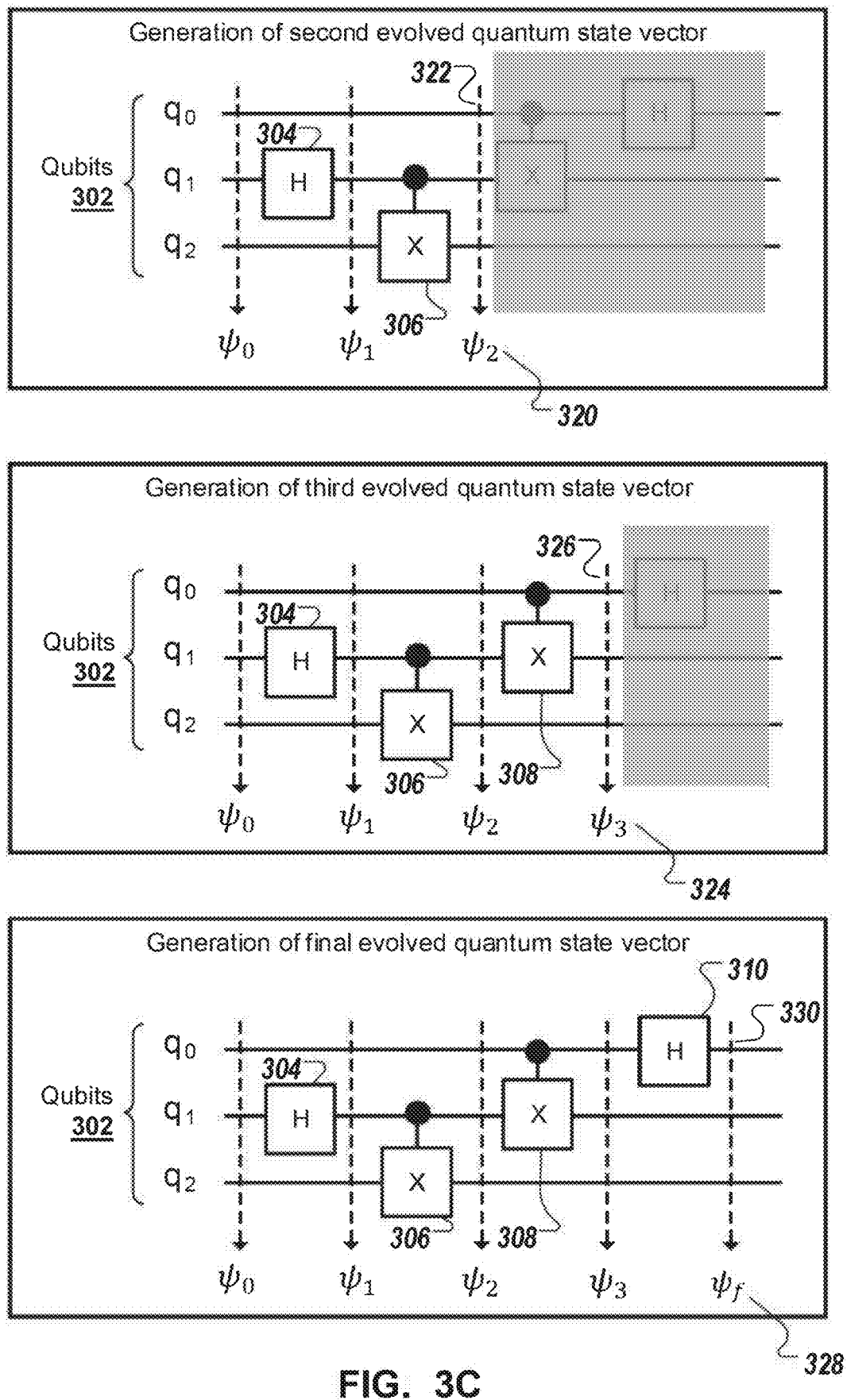
FIG. 3C shows example second, third, and final evolved quantum state vectors for the quantum circuit shown in FIG. 3A.

FIG. 3C shows an example second evolved quantum state vector 320 for the example quantum circuit 300 shown in FIG. 3A. The second evolved quantum state vector 320 corresponds to evolution of the initial quantum state vector $\psi_0$ under a second portion of the quantum circuit 300, where in this example the second portion of the quantum circuit includes the first Hadamard gate 304 and the first CNOT gate 306 (that is, the second portion of the quantum circuit includes the first portion of the quantum circuit). In other words, the second evolved quantum state vector 320 corresponds to evolution of the first evolved quantum state vector $\psi_1$ under the first CNOT gate 306. The second evolved quantum state vector 320 for the quantum circuit corresponds to a time-stamp at time t=2 (represented by the vertical dashed line 322) and is therefore also labelled and referred to herein as $\psi_2$.

FIG. 3C also shows an example third evolved quantum state vector 324 for the example quantum circuit 300 shown in FIG. 3A. The third evolved quantum state vector 324 corresponds to evolution of the initial quantum state vector to under a third portion of the quantum circuit 300, where in this example the third portion of the quantum circuit includes the first Hadamard gate 304, the first CNOT gate 306, and the second CNOT gate 308 (that is, the third portion of the quantum circuit includes the second portion of the quantum circuit). In other words, the third evolved quantum state vector 324 corresponds to evolution of the second evolved quantum state vector $\psi_2$ under the second CNOT gate 308. The third evolved quantum state vector 322 for the quantum circuit corresponds to a time-stamp at time t=3 (represented by the vertical dashed line 326) and is therefore also labelled and referred to herein as $\psi_3$.

FIG. 3C also shows an example final evolved quantum state vector 328 for the example quantum circuit 300 shown in FIG. 3A. The final evolved quantum state vector 328 corresponds to evolution of the initial quantum state vector Wo under a fourth portion of the quantum circuit 300, where in this example the fourth portion of the quantum circuit corresponds to the whole quantum circuit (that is, the fourth portion of the quantum circuit includes the third portion of the quantum circuit). In other words, the final evolved quantum state vector 328 corresponds to evolution of the third evolved quantum state vector $\psi_3$ under the second Hadamard gate 310. The final evolved quantum state vector 328 for the quantum circuit corresponds to a final time-stamp at time t=f (represented by the vertical dashed line 330) and is therefore also labelled and referred to herein as $\psi_f$.

In the examples shown in FIGS. 3B and 3C, four evolved quantum state vectors 316, 320, 324, and 328 are generated, however this is for illustrative purposes only and fewer or more evolved quantum state vectors can be generated. Generally, increasing the number of evolved quantum state vectors generated at this stage of the process increases the search space for a brute force attack and improves the avalanche effect of hash digest generation. In addition, in the examples shown in FIGS. 3B and 3C, the quantum circuit is partitioned (e.g., using the time stamps represented by vertical dashed lines 314, 318, 322, 326, and 330) such that each partition includes one quantum logic gate. However, this is for illustrative purposes only and generally each partition can include multiple quantum logic gates (where quantum logic gates do not span different partitions).

Returning to FIG. 2, the system applies a splitting operation to the initial quantum state vector and to each of the evolved quantum state vectors (step 206). For example, for each quantum state vector in the plurality of quantum state vectors, the system can identify a real part and an imaginary part of the quantum state vector, e.g., by parsing the complex number associated with the quantum state vector and applying a splitting operation to split the complex number into a real part and an imaginary part Additional details of the splitting operation are described with reference to FIG. 4 below. The system can then generate a floating point binary representation of the real part of the quantum state vector and a floating point binary representation of the imaginary part of the quantum state vector.

Figure 4:
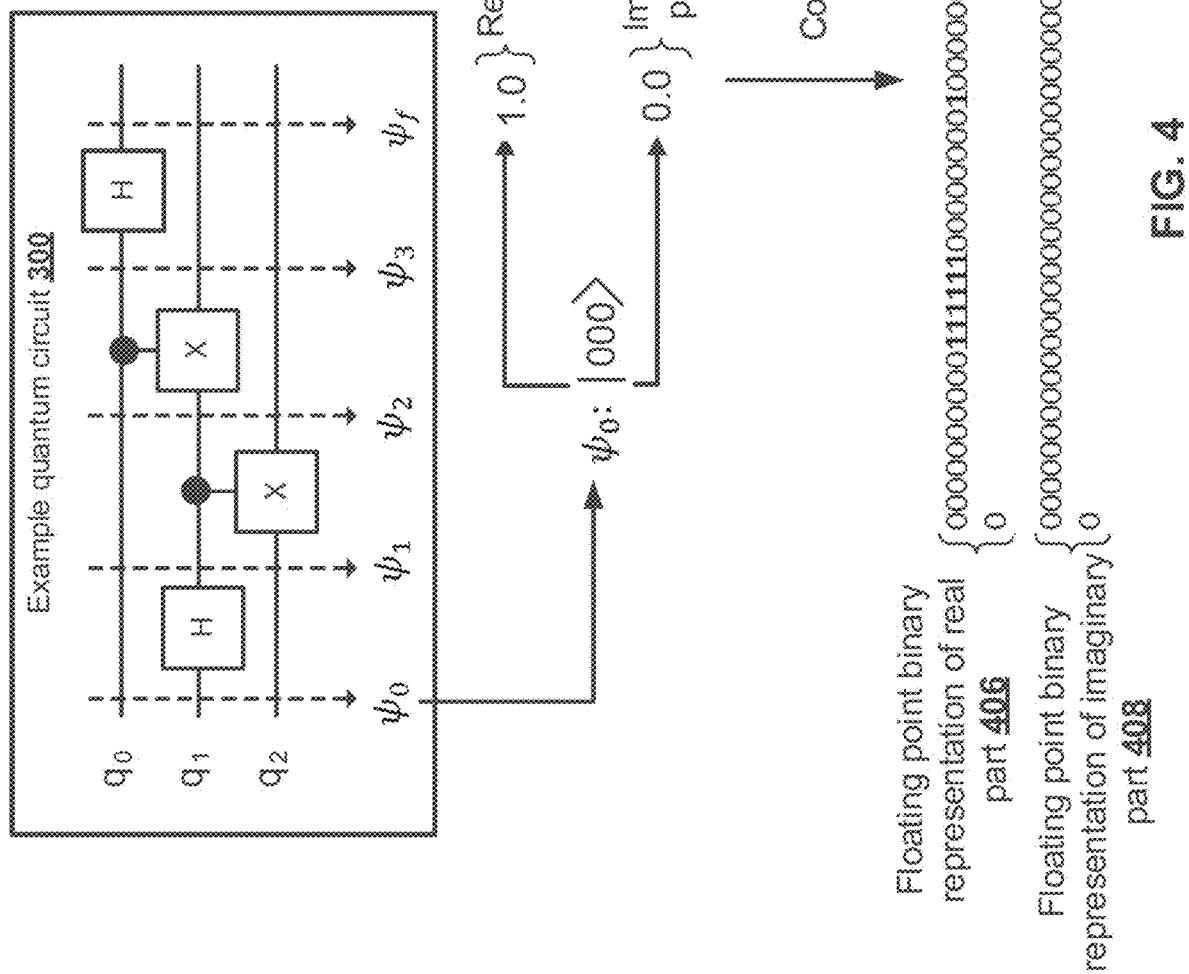
FIG. 4 illustrates an example application of a splitting operation to a quantum state vector.

FIG. 4 illustrates an example application of a splitting operation to a quantum state vector (e.g., which is used, as described at step 206 of FIG. 2, to split a quantum state vector into a real and imaging part). In this example, the splitting operation is applied to the initial quantum state vector $\psi_0$ shown in FIG. 3B, which is assumed to correspond to an input quantum state $\psi_0=|000\rangle$. The initial quantum state vector $|000\rangle$ is split into a real part 402, which in this example has a value of 1.0, and an imaginary part 404, which in this example has a value of 0.0. The real and imaginary parts correspond to the weights of the real and imaginary parts of the quantum state vector. As another example, if the quantum state vector were to be $$\psi_{example} = \frac{1}{\sqrt{2}}|010\rangle + \frac{i}{\sqrt{2}}|100\rangle$$

then both the real part and the imaginary part would be equal to $$\frac{1}{\sqrt{2}}.$$

The real part 402 and imaginary part 404 are then converted to floating point binary to obtain a floating point binary representation of the real part 406 and a floating point binary representation of the imaginary part 408. In the example shown in FIG. 4, the real part 402 and imaginary part 404 of the quantum state vector have been converted to double precision 64-bit IEEE 754 floating points, however other conversions could also be used, e.g., 32-bit conversions.

Returning to FIG. 2, the system combines the floating point binary representation of the real part of the quantum state vector and the floating point binary representation of the imaginary part of the quantum state vector (step 208). For example, in some implementations, the system can concatenate the floating point binary representation of the real part of the quantum state vector and the floating point binary representation of the imaginary part of the quantum state vector generated at step 206 to obtain a final floating point binary representation of the quantum state vector. In other implementations, the system can interleave (as described and depicted with reference to FIG. 5) the floating point binary representation of the real part of the quantum state vector with the floating point binary representation of the imaginary part of the quantum state vector generated at step 206, to obtain a final floating point binary representation of the quantum state vector.

Figure 5:
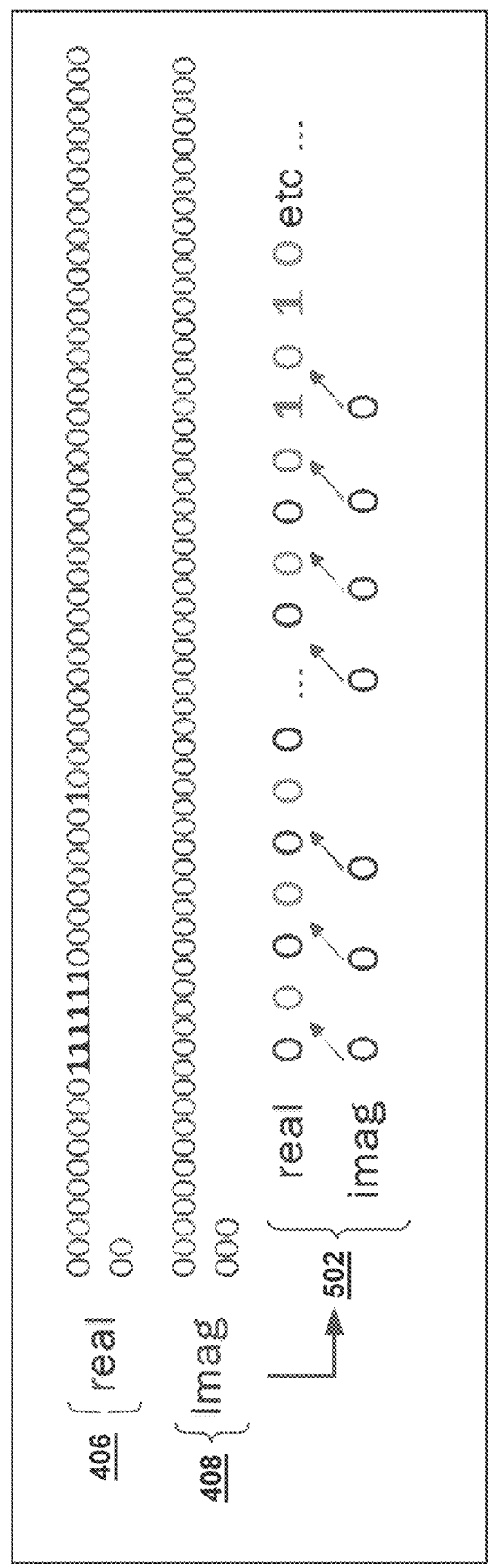
FIG. 5 illustrates an example interleaving of a floating point binary representation of a real part imaginary part of a quantum state vector.

FIG. 5 illustrates an example interleaving of the floating point binary representation of the real part 406 and the floating point binary representation of the imaginary part 408 shown in FIG. 4. In this example, individual bits of the floating point binary representation of the real part 406 and the imaginary part 408 alternate so to produce the final floating point binary representation of the quantum state vector 502. However, other interleaving strategies can also be implemented, e.g., where groups of multiple bits from each of the real and imaginary floating point binary representations are iteratively interleaved to produce the final floating point binary representation of the quantum state vector.

Returning to FIG. 2, the system iteratively applies logical operations, e.g., XOR operations, to the floating point binary representations of the initial and evolved quantum state vectors to obtain a binary string (step 210). For example, in some implementations, the system can perform step 210 directly after step 204, e.g., directly generate a floating point binary representation of each quantum state vector and apply the XOR operations accordingly. In other implementations, the system can perform steps 206 and 208 and generate concatenated floating point binary representations or interleaved floating point binary representations of the quantum state vectors and apply the XOR operations accordingly.

For a first iteration, the system can apply a first XOR operation between a floating point binary representation of the initial quantum state vector and a floating point binary representation of a first evolved quantum state vector. Then, for each subsequent iteration, the system can apply a XOR operation between an output of a previous iteration and a floating point binary representation of a current evolved quantum state vector for the iteration. In other words, the system can iteratively compute $$X_i = X_{i+1} \oplus \psi_i$$

where $X_i$ represents a binary string obtained at iteration i and $\psi_i$ represents an i-th quantum state vector and $X_0$ is set as equal to $\psi_0$. In some implementations, the system can encrypt the floating point binary representations of the quantum state vectors prior to application of the XOR operations, e.g., to increase cyber security.

Figure 6:
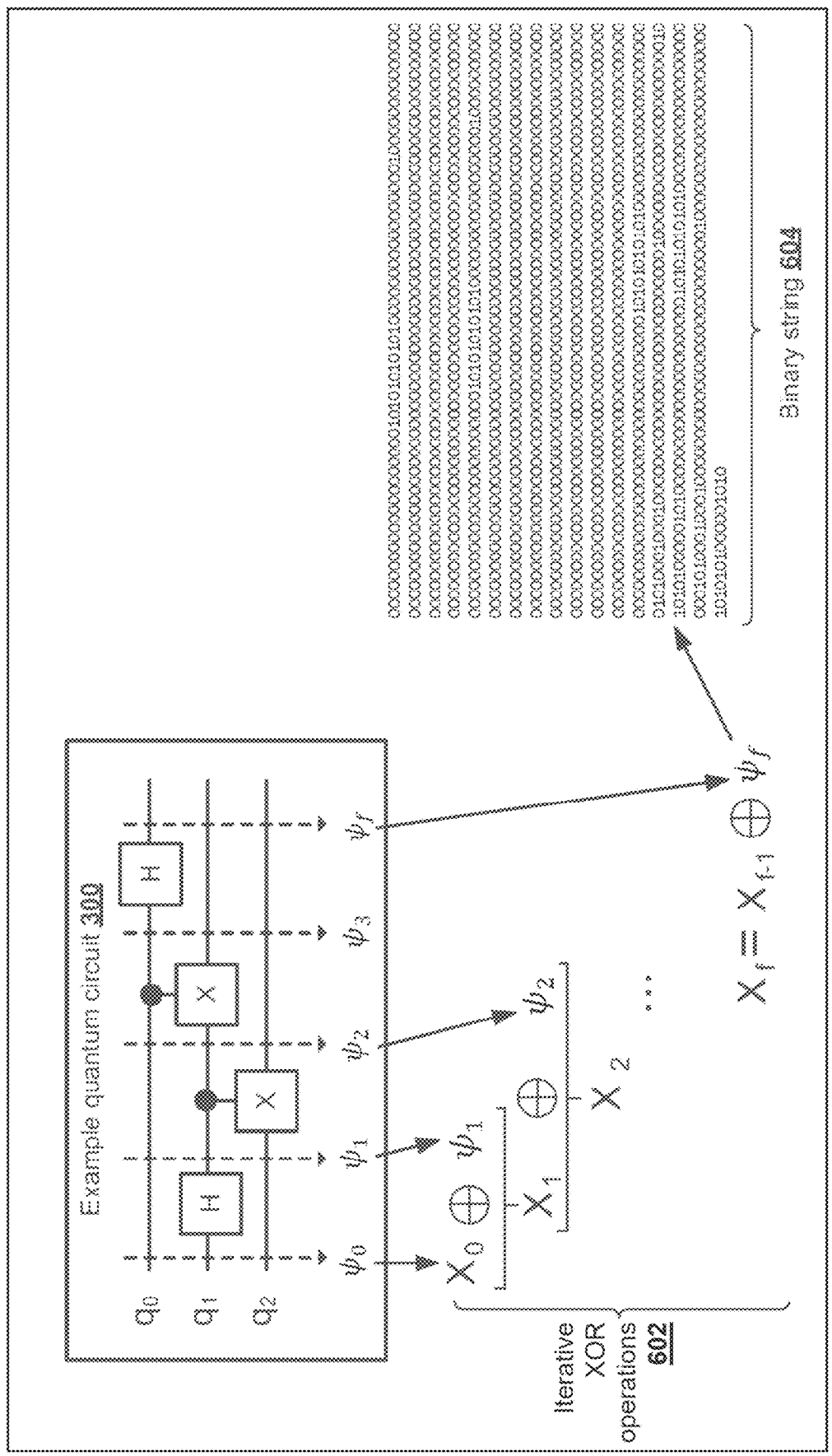
FIG. 6 illustrates an example sequence of iterative XOR operations.

One example sequence of iterative XOR operations 602 for the example quantum circuit 300 of FIG. 3A, are described and depicted with reference to FIG. 6. As shown in FIG. 6, prior to the first iteration, the initial binary string $X_0$ is set as equal to the floating point binary representation of the initial quantum state vector $\psi_0$ (e.g., concatenated floating point binary representations of the real and imaginary parts of the initial quantum state vector or interleaved floating point binary representations of the real and imaginary parts of the initial quantum state vector). In the first iteration, a binary string for the iteration $X_1$ is computed through application of a XOR operation to the initial binary string $X_0$ and the first evolved quantum state vector $\psi_1$ (e.g., concatenated floating point binary representations of the real and imaginary parts of the initial quantum state vector or interleaved floating point binary representations of the real and imaginary parts of the initial quantum state vector). In a second iteration, a binary string for the iteration $X_2$ is computed through application of a XOR operation to the initial binary string $X_1$ and the second evolved quantum state vector $\psi_2$ (e.g., concatenated floating point binary representations of the real and imaginary parts of the initial quantum state vector or interleaved floating point binary representations of the real and imaginary parts of the initial quantum state vector). This iterative application of XOR operations is repeated until a final binary string $X_f$ 604 is computed through application of a XOR operation to a binary string $X_{f-1}$ obtained in a previous iteration and the final evolved quantum state vector $\psi_f$ (e.g., concatenated floating point binary representations of the real and imaginary parts of the initial quantum state vector or interleaved floating point binary representations of the real and imaginary parts of the initial quantum state vector).

Returning to FIG. 2, the system applies a hash function to the binary string (obtained at step 210) to generate a cryptographic hash digest of the quantum circuit (step 212). The system can provide the hash digest for use in various applications, e.g., verification or data identification. An example process for generating a hash digest of quantum information and using the hash digest to verify an implementation of a quantum circuit is described below with reference to FIG. 7. Example hash functions include functions from the SHA family, e.g., SHA-224, -256, -384, -512, functions from the BLAKE family, Whirlpool functions, or weaker functions such as SHA-1 or MD-5.

In some implementations the system can perform additional operations on the generated hash digest to enhance the security of the hash digest, e.g., apply the quantum fingerprint techniques described in U.S. patent application Ser. No. 18/229,930, the entire contents of which are incorporated by reference.

Figure 7:
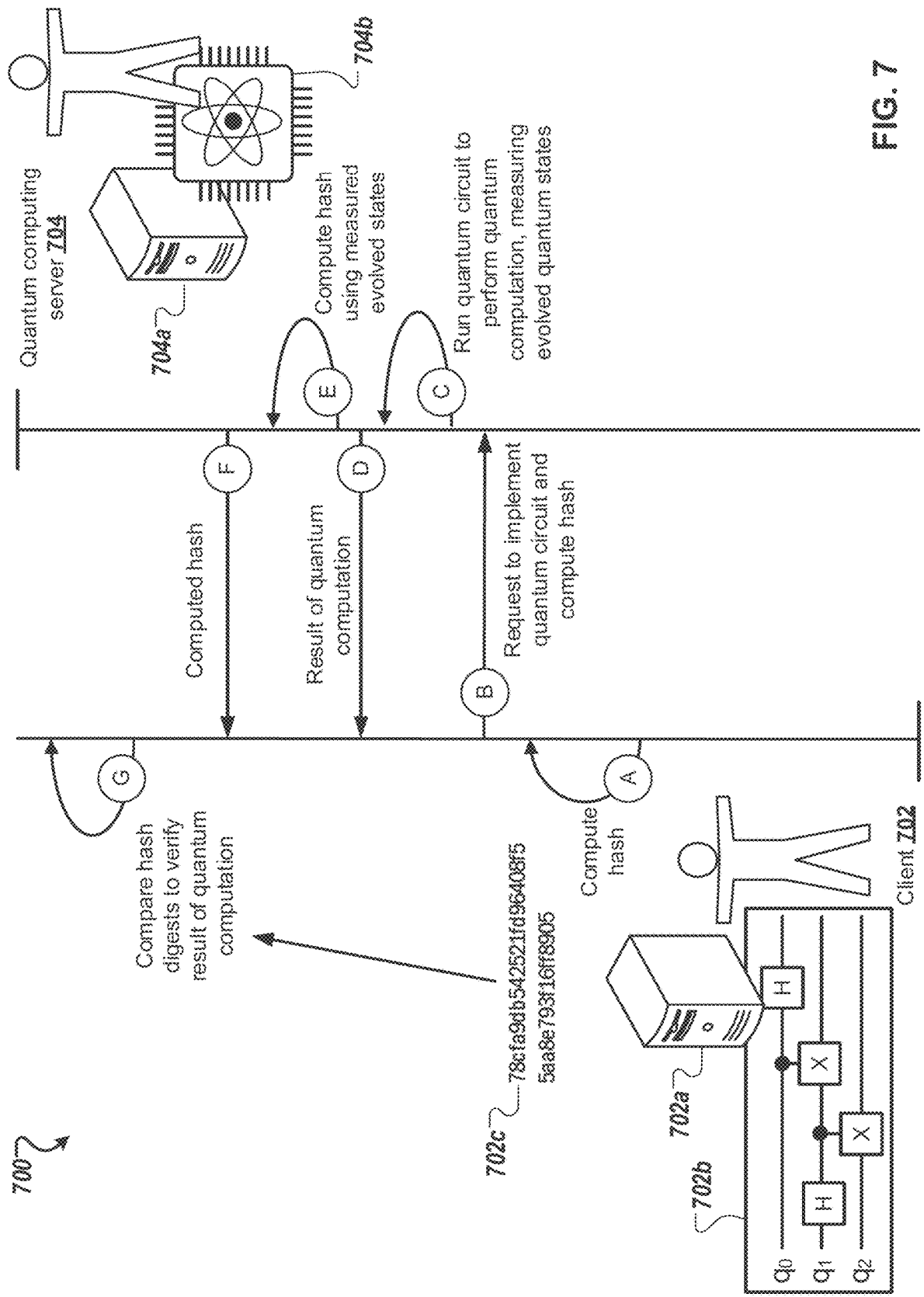
FIG. 7 shows a conceptual block diagram of an example process for using a hash digest of quantum information to verify an implementation of a quantum circuit.

FIG. 7 shows a conceptual block diagram of an example process 700 for using a hash digest of quantum information to verify an implementation of a quantum circuit. The example process 700 is performed between a client 702 and a quantum computing server 704. The client 702 includes a client classical processor 702a that is configured to perform classical computations to generate a cryptographic hash digest of quantum information, e.g., according to example process 200 of FIG. 2.

For example, the client 702 may have designed a quantum circuit 702b, e.g., that implements a particular quantum algorithm, prepares a particular quantum state, or that encodes sensitive classical or quantum data. In some implementations, the client 702 may not have direct access to a quantum computer or may not have direct access to a quantum computer that has the processing capabilities to run the quantum circuit 702b. Therefore, the client 702 may need to use a separate quantum computing server/computer/platform, quantum computing server 704, to run the quantum circuit 702b.

In some implementations, and as shown in FIG. 7, the quantum computing server 704 includes a server classical processor 704a in data communication with a server quantum computing device 704b. For convenience, the server classical processor 704a and server quantum computing device 704b are illustrated as separate entities. However, in some implementations the classical processor 704a can be included in the quantum computing device 604b. That is, the quantum computing device 704b can include components for performing classical computing operations. The client classical processor 702a and server classical processor 704a or server quantum computing device 704b can exchange electronic communications over one or more networks, or can exchange communications in another way, such as over one or more wired or wireless connections.

The server quantum computing device 704b is configured to perform quantum computations. A quantum computation can proceed by initializing a system of physical qubits in a selected initial quantum state and applying a quantum circuit, e.g., a sequence of quantum logic gates, to the initial state. The quantum logic gates can be implemented by applying control signals generated by a control and measurement system to the qubits and to couplers that enable interactions between the qubits. The quantum computation can be completed by measuring the states of the qubits, e.g., using a quantum observable, using respective control signals. The server classical processor 704a is configured to perform classical operations including, e.g., processing instructions for execution within the control and measurement system of the quantum computing device 704b and post-processing measured qubit states to determine results of quantum computations.

During stage (A) of the example process 700 for using a hash digest of quantum information to verify an implementation of a quantum circuit, the client 702 computes a cryptographic hash digest 702c of their quantum circuit 702b. For example, the client 702 can use the client classical processor 702a to implement operations according to example process 200 of FIG. 2 to compute the cryptographic hash digest 702c.

During stage (B) of the example process 700, the client transmits a request to the quantum computing server 704. The request includes data that represents the quantum circuit 702b and instructs the quantum computing server 704 to perform a quantum computation by executing the quantum circuit 702b on a specific initial quantum state of a quantum system. The request can also instruct the quantum computing server 704 to implement a variant of example process 200 of FIG. 2 to compute a cryptographic hash digest of the quantum circuit 702b, e.g., where the one or more evolved quantum state vectors are generated through physical measurement of the quantum system instead of through classical computation. The request can instruct the quantum computing server 704 to return the computed hash digest to the client 702 along with a result of the performed quantum computation.

During stage (C) of the example process 700, the quantum computing server 704 receives the request transmitted by the client 702 at stage (B) and performs the requested quantum computation. When performing the requested quantum computation, the quantum computing server 704 can perform additional quantum computations, e.g., measurements, to generate and store evolved quantum state vectors according to the request sent by the client 702 at stage (B). During stage (D) of the example process 700, the quantum computing server 704 transmits results of the quantum computation to the client 702.

During stage (E) of the example process 700, the quantum computing server 704 implements a variant of example process 200 of FIG. 2 to compute a cryptographic hash digest of the quantum circuit implemented at stage (C). That is, the quantum computing server 704 can use the evolved quantum state vectors that were measured and stored at stage (C) to perform steps 206-212 of example process 200 and generate the hash digest. During stage (F) of the example process 700, the quantum computing server 704 transmits the hash digest to the client 702.

During stage (G) of the example process 700, the client 702 verifies the result of the quantum computation by comparing the hash digest 702c generated during stage (A) with the hash digest transmitted from the quantum computing server 704 at stage (F). The client 702 can determine whether the hash digests match. In response to determining that the hash digests match, the client 702 can verify that the quantum computation was executed as intended, e.g., without any modifications or tampering (which could be made by the quantum computing server 704 or by a third party adversary). In response to determining that the hash digests do not match, the client 702 can discard the results of the quantum computation received at stage (D).

Example process 700 can be applied in a variety of settings. For example, the client 702 could be, e.g., a drug manufacturing company that designs quantum algorithms and/or circuits for improved (e.g., optimal) drug discovery. In this setting the client 702 would want to ensure that the quantum computing server 704 is accurately implementing the quantum algorithms and/or circuits, since otherwise the results of the computations would be compromised, e.g., not optimal.

Figure 8:
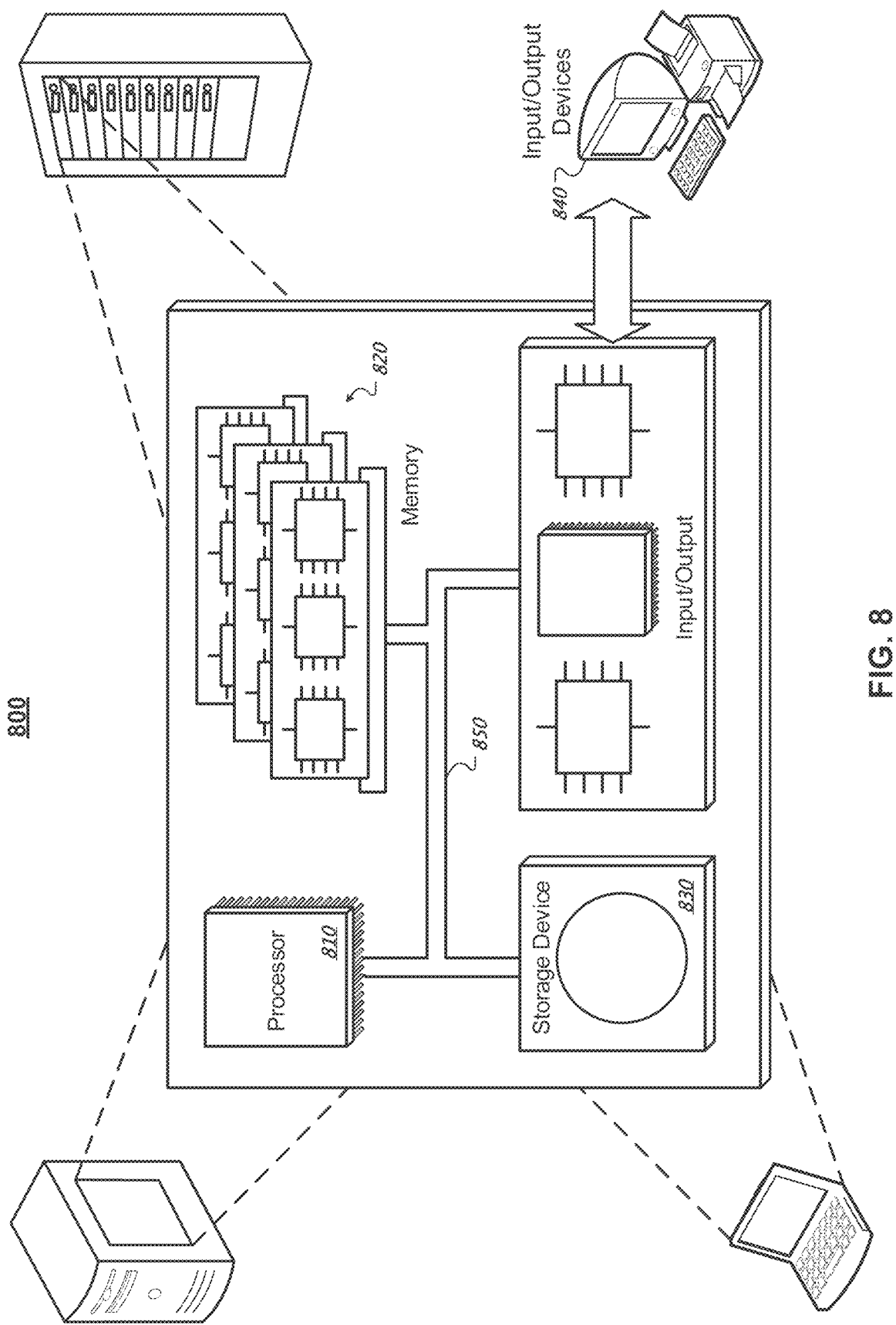
FIG. 8 illustrates a schematic diagram of an exemplary generic classical processor system.

FIG. 8 illustrates a schematic diagram of an exemplary generic classical processor system 800. The system 800 can be used for the classical operations described in this specification according to some implementations. The system 800 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 800 includes a processor 810, a memory 820, a storage device 830, and an input/output device 840. Each of the components 810, 820, 830, and 820 are interconnected using a system bus 850. The processor 810 may be enabled for processing instructions for execution within the system 800. In one implementation, the processor 810 is a single-threaded processor. In another implementation, the processor 810 is a multi-threaded processor. The processor 810 may be enabled for processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 may be enabled for providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Figure 9:
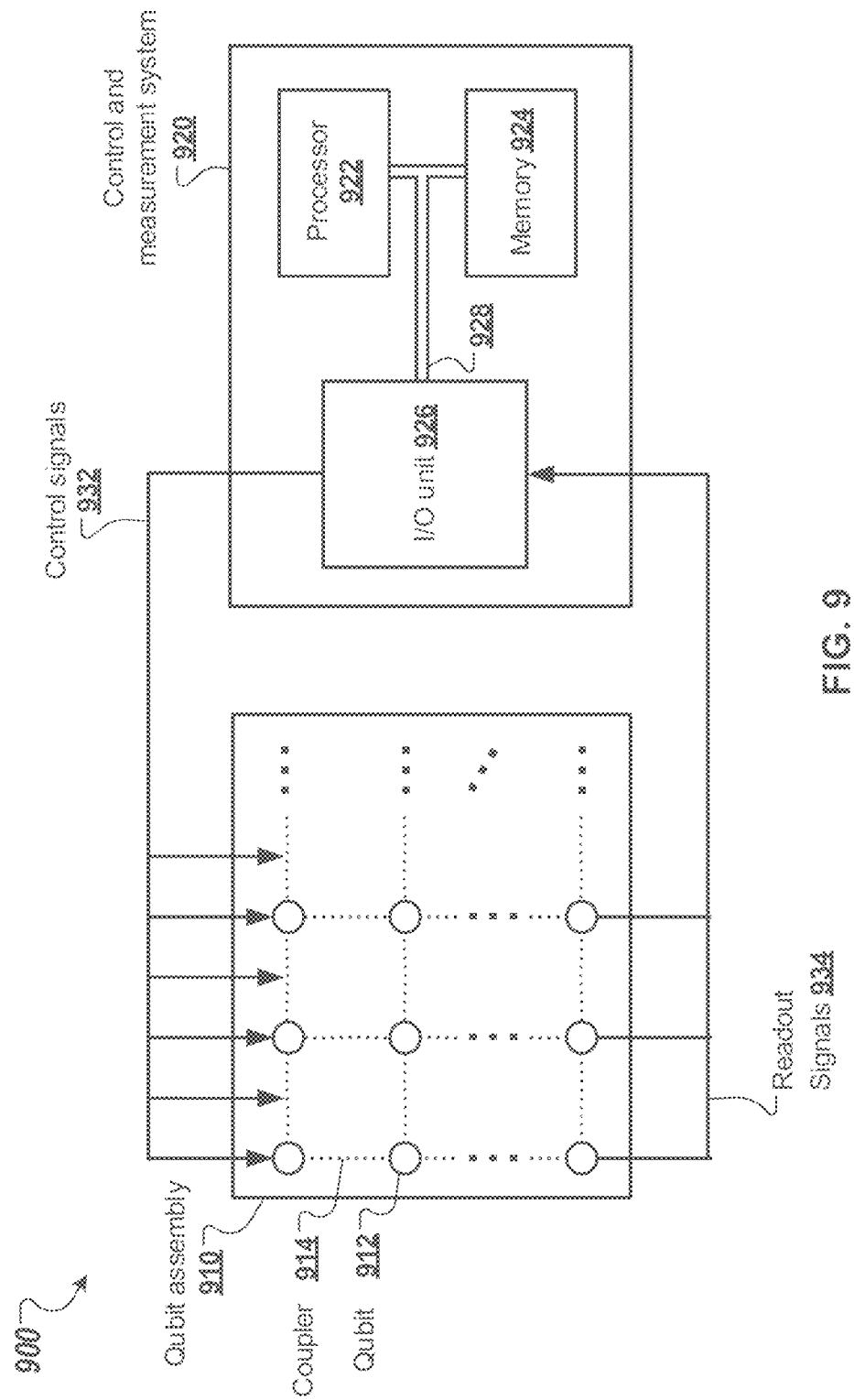
FIG. 9 is a block diagram of an example quantum computing device.

FIG. 9 is a block diagram of an example quantum computing device 900. The quantum computing device 900 can be used to perform the quantum computation operations described in this specification according to some implementations. The quantum computing device 900 is intended to represent various forms of quantum computing devices. The components shown here, their connections and relationships, and their functions, are exemplary only, and do not limit implementations of the inventions described and/or claimed in this document.

The quantum computing device 900 includes a qubit assembly 910 and a control and measurement system 920. The qubit assembly includes multiple qubits, e.g., qubit 912, that are used to perform algorithmic operations or quantum computations. While the qubits shown in FIG. 9 are arranged in a rectangular array, this is a schematic depiction and is not intended to be limiting. The qubit assembly 910 also includes adjustable coupling elements, e.g., coupler 914, that allow for interactions between coupled qubits. In the schematic depiction of FIG. 9, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 900 or the type of quantum computations that the quantum computing device 900 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z (also referred to as X, Y, Z), Hadamard and S gates, two-qubit gates, e.g., controlled-X, controlled-Y, controlled-Z (also referred to as CX, CY, CZ), and gates involving three or more qubits, e.g., Toffoli gates. The quantum logic gates can be implemented by applying control signals 932 generated by the control and measurement system 920 to the qubits and to the couplers.

For example, in some implementations the qubits in the qubit assembly 910 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 932 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as Z, using respective control signals 934. The measurements cause readout signals 934 representing measurement results to be communicated back to the measurement and control system 920. The readout signals 934 may include RF, microwave, or optical signals depending on the physical scheme for the quantum computing device 900 and/or the qubits. For convenience, the control signals 932 and readout signals 934 shown in FIG. 9 are depicted as addressing only selected elements of the qubit assembly (i.e. the top and bottom rows), but during operation the control signals 932 and readout signals 934 can address each element in the qubit assembly 910.

The control and measurement system 920 is an example of a classical computer system that can be used to perform various operations on the qubit assembly 910, as described above. The control and measurement system 920 includes one or more classical processors, e.g., classical processor 922, one or more memories, e.g., memory 924, and one or more I/O units, e.g., I/O unit 926, connected by one or more data buses, e.g., bus 926. The control and measurement system 920 can be programmed to send sequences of control signals 932 to the qubit assembly, e.g. to carry out a selected series of quantum gate operations, and to receive sequences of readout signals 934 from the qubit assembly, e.g. as part of performing measurement operations.

The processor 922 is configured to process instructions for execution within the control and measurement system 920. In some implementations, the processor 922 is a single-threaded processor. In other implementations, the processor 922 is a multi-threaded processor. The processor 922 is capable of processing instructions stored in the memory 924.

The memory 924 stores information within the control and measurement system 920. In some implementations, the memory 924 includes a computer-readable medium, a volatile memory unit, and/or a non-volatile memory unit. In some cases, the memory 924 can include storage devices capable of providing mass storage for the system 920, e.g. a hard disk device, an optical disk device, a storage device that is shared over a network by multiple computing devices (e.g., a cloud storage device), and/or some other large capacity storage device.

The input/output device 926 provides input/output operations for the control and measurement system 920. The input/output device 926 can include D/A converters, A/D converters, and RF/microwave/optical signal generators, transmitters, and receivers, whereby to send control signals 932 to and receive readout signals 934 from the qubit assembly, as appropriate for the physical scheme for the quantum computer. In some implementations, the input/output device 926 can also include one or more network interface devices, e.g., an Ethernet card, a serial communication device, e.g., an RS-232 port, and/or a wireless interface device, e.g., an 802.11 card. In some implementations, the input/output device 926 can include driver devices configured to receive input data and send output data to other external devices, e.g., keyboard, printer and display devices.

Although an example control and measurement system 920 has been depicted in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules (or engines) of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   obtaining data representing a quantum circuit;
   generating an initial quantum state vector, wherein the initial quantum state vector comprises an input quantum state vector for the quantum circuit;
   generating, using the initial quantum state vector, one or more evolved quantum state vectors, wherein each evolved quantum state vector is generated by applying a respective portion of the quantum circuit to the initial quantum state vector;
   iteratively applying logical operations to floating point binary representations of the initial and evolved quantum state vectors to obtain a binary string; and
   applying a hash function to the binary string to obtain a cryptographic hash digest of the quantum circuit.

2. The method of claim 1, wherein iteratively applying logical operations to floating point binary representations of the quantum state vectors to obtain a binary string comprises:
   for a first iteration, applying a first logical operation between a floating point binary representation of the initial quantum state vector and a floating point binary representation of a first evolved quantum state vector, and for each iteration after the first iteration, applying a logical operation between an output of a previous iteration and a floating point binary representation of a current evolved quantum state vector for the iteration.

3. The method of claim 1, wherein the logical comprise XOR operations.

4. The method of claim 1, further comprising, for each quantum state vector:

identifying a real part and an imaginary part of the quantum state vector; and generating a floating point binary representation of the real part of the quantum state vector and a floating point binary representation of the imaginary part of the quantum state vector.

5. The method of claim 3, wherein identifying the real part and the imaginary part of the quantum state vector comprises parsing a complex number associated with the quantum state vector and applying a splitting operation to split the complex number into a real part and an imaginary part.

6. The method of claim 2, further comprising, for each quantum state vector:

concatenating the floating point binary representation of the real part of the quantum state vector and the floating point binary representation of the imaginary part of the quantum state vector, wherein iteratively applying the logical operations to the floating point binary representations of the quantum state vectors to obtain the binary string comprises iteratively applying the logical operations to concatenated floating point binary representations of the quantum state vectors.

7. The method of claim 2, further comprising, for each quantum state vector:

interleaving the floating point binary representation of the real part of the quantum state vector with the floating point binary representation of the imaginary part of the quantum state vector, wherein iteratively applying the logical operations to the floating point binary representations of the quantum state vectors to obtain the binary string comprises iteratively applying the logical operations to interleaved floating point binary representations of the quantum state vectors.

8. The method of claim 1, further comprising encrypting the floating point binary representations of the quantum state vectors prior to application of the logical operations.

9. The method of claim 1, further comprising partitioning, in time, the quantum circuit into one or more portions, wherein each evolved quantum state vector corresponds to evolution of the initial quantum state vector under a respective portion of the quantum circuit.

10. The method of claim 1, wherein the quantum circuit implements a quantum algorithm or prepares a target quantum state.

11. The method of claim 1, further comprising:

receiving a classical data input; and encoding the classical data input as a quantum circuit.

12. The method of claim 1, wherein generating the one or more evolved quantum state vectors comprises performing classical computations.

13. The method of claim 1, further comprising:

transmitting, to a quantum computing server, a request that instructs the quantum computing server to:

execute the quantum circuit on an initial quantum state that corresponds to the initial quantum state vector, and compute a cryptographic hash digest of the quantum circuit using measured evolved quantum state vectors;

receiving, from the quantum computing server, results of execution of the quantum circuit and the cryptographic hash digest;

verifying the results of execution of the quantum circuit using the cryptographic hash digest computed by the quantum computing server.

14. A system comprising one or more computers and one or more storage devices storing instructions that are operable, when executed by the one or more computers, to cause the one or more computers to perform operations comprising:

obtaining data representing a quantum circuit;

generating an initial quantum state vector, wherein the initial quantum state vector comprises an input quantum state vector for the quantum circuit;

generating, using the initial quantum state vector, one or more evolved quantum state vectors, wherein each evolved quantum state vector is generated by applying a respective portion of the quantum circuit to the initial quantum state vector;

iteratively applying logical operations to floating point binary representations of the initial and evolved quantum state vectors to obtain a binary string; and applying a hash function to the binary string to obtain a cryptographic hash digest of the quantum circuit.

15. A non-transitory computer-readable storage medium comprising instructions stored thereon that are executable by a processing device and upon such execution cause the processing device to perform operations comprising:

obtaining data representing a quantum circuit;

generating an initial quantum state vector, wherein the initial quantum state vector comprises an input quantum state vector for the quantum circuit;

generating, using the initial quantum state vector, one or more evolved quantum state vectors, wherein each evolved quantum state vector is generated by applying a respective portion of the quantum circuit to the initial quantum state vector;

iteratively applying logical operations to floating point binary representations of the initial and evolved quantum state vectors to obtain a binary string; and applying a hash function to the binary string to obtain a cryptographic hash digest of the quantum circuit.

16. A method performed by a quantum computing device, the method comprising:

obtaining data specifying a quantum computation, wherein the data comprises data representing a quantum circuit, an initial quantum state of a quantum system, and instructions to compute a cryptographic hash digest of the quantum circuit;

applying the quantum circuit to the initial quantum state of the quantum system to perform the quantum computation, comprising generating one or more evolved quantum state vectors according to the instructions to compute the cryptographic hash digest of the quantum circuit, wherein generating each evolved quantum state vector comprises applying a respective portion of the quantum circuit to the initial quantum state;

iteratively applying logical operations to floating point binary representations of the initial quantum state and the one or more evolved quantum state vectors to obtain a binary string; and applying a hash function to the binary string to obtain a cryptographic hash digest of the quantum circuit.

17. The method of claim 16, wherein the data specifying the quantum computation is received from a client device and the method further comprises transmitting a result of the quantum computation and the cryptographic hash digest of the quantum circuit to the client device.

18. A system comprising:
one or more classical processors; and
quantum computing hardware;
wherein the system is configured to perform operations comprising:
obtaining data specifying a quantum computation, wherein the data comprises data representing a quantum circuit, an initial quantum state of a quantum system, and instructions to compute a cryptographic hash digest of the quantum circuit;
applying the quantum circuit to the initial quantum state of the quantum system to perform the quantum computation, comprising generating one or more evolved quantum state vectors according to the instructions to compute the cryptographic hash digest of the quantum circuit, wherein generating each evolved quantum state vector comprises applying a respective portion of the quantum circuit to the initial quantum state;
iteratively applying logical operations to floating point binary representations of the initial quantum state and the one or more evolved quantum state vectors to obtain a binary string; and
applying a hash function to the binary string to obtain a cryptographic hash digest of the quantum circuit.

* * * * *